United States Patent [19]

Kerst et al.

[11] Patent Number: 4,641,852
[45] Date of Patent: Feb. 10, 1987

[54] RESILIENT COUPLING

[75] Inventors: Gerrit Kerst; Hendrik Kerst, both of Johannesburg, South Africa

[73] Assignee: Brelko (Proprietary) Limited, Johannesburg, South Africa

[21] Appl. No.: 794,446

[22] Filed: Nov. 4, 1985

[30] Foreign Application Priority Data

Nov. 16, 1984 [ZA] South Africa .................. 84/8966

[51] Int. Cl.$^4$ ........................................... B60D 1/00
[52] U.S. Cl. ................................................. 280/489
[58] Field of Search ............... 280/486, 487, 483, 484, 280/485, 489

[56] References Cited

U.S. PATENT DOCUMENTS 4,147,376  4/1979  Slazas ................................... 280/489
4,254,966  3/1981  Mitchell .......................... 280/489 X

FOREIGN PATENT DOCUMENTS 502721  12/1954  Italy ..................................... 280/483
317998   3/1957  Switzerland ......................... 280/485

Primary Examiner—John A. Pekar
Attorney, Agent, or Firm—Leydig, Voit & Mayer

[57] ABSTRACT

The invention provides for a trailer coupling which includes one or more torque elements having pads of elastic material interposed between an inner angular member and an outer angular member. The pads of elastic material permit but resist relative movement between the inner and the outer members. The inner and outer members are connected by linkages to attachment plates. The coupling can be attached to an between a draughting vehicle and a trailer to transmit traction force to the trailer. The resilient deformation of the pads of elastic material dampen relative movement between the draughting vehicle and the trailer.

3 Claims, 5 Drawing Figures

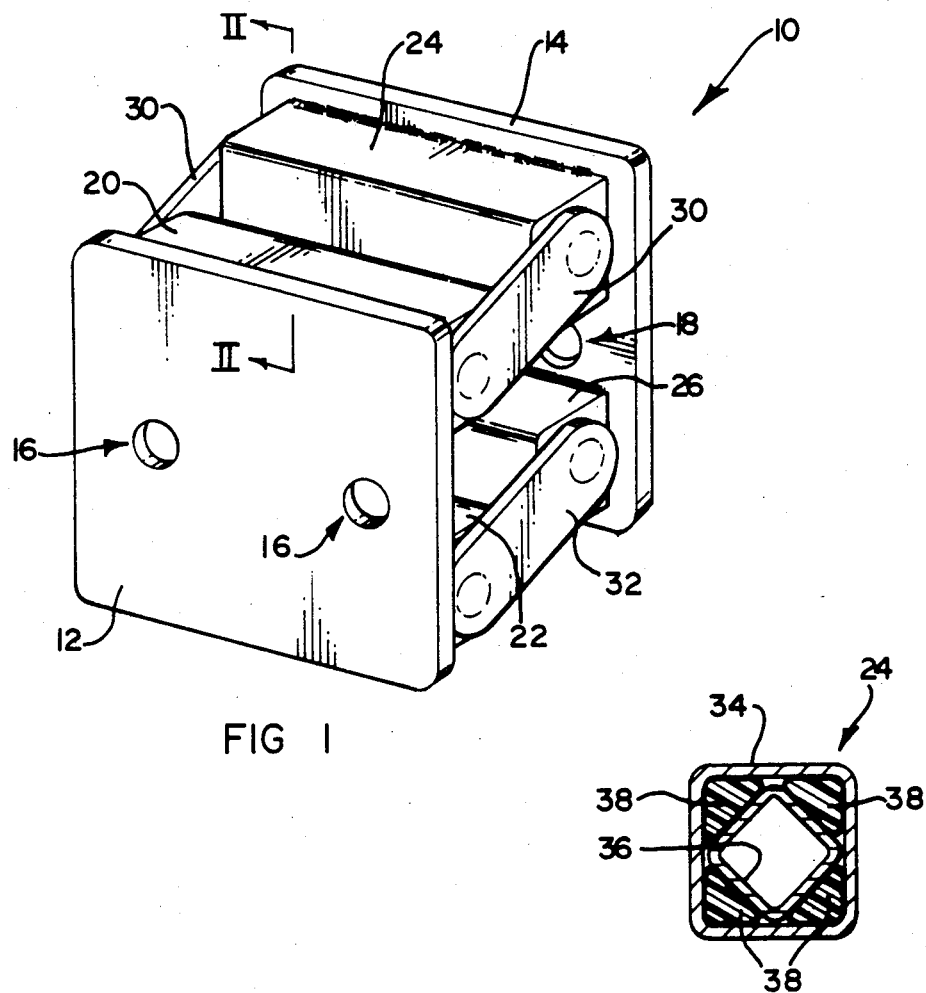
FIG 1
FIG 2
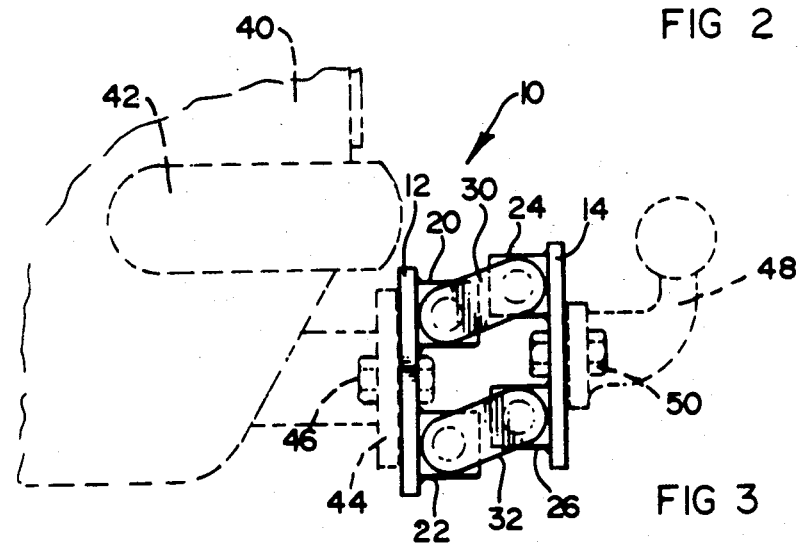
FIG 3

RESILIENT COUPLING

This invention relates to a coupling. The invention relates more particularly to a trailer coupling for transmitting traction force from a draughting vehicle to a trailer.

According to the invention there is provided a trailer coupling which includes at least one torque element which is resiliently yieldable under torque and which is arranged to permit relative movement between the draughting vehicle and the trailer in the direction of the traction force, and which is further adapted to resist such relative movement to thereby damp the relative movement. The trailer coupling further includes two attachment plates, one for attaching the coupling to a drafting vehicle and the other for attaching it to a trailer. The attachment plates are spaced apart from each other with the torque element between them, and the torque element is fast with one of the plates and is operatively associated with the other attachment plate by means of a linkage.

According to the invention, there is provided a trailer coupling comprising a plurality of torque elements having outer members, at least one torque element being resiliently yieldable under torque, arranged to permit relative movement between the drafting vehicle and the trailer in the direction of the traction force, and adapted to resist such relative movement to thereby damp the relative movement. The coupling further comprising two spaced attachment plates, one for attaching the coupling to a drafting vehicle and the other for attaching it to a trailer. Each attachment plate is integral in one piece from the same sheet material with the outer members of a pair of torque elements.

According to the invention, there is further provided a trailer coupling comprising four torque elements, at least one torque element being resiliently yieldable under torque, arranged to permit relative movement between the drafting vehicle and the trailer in the direction of the traction force, and adapted to resist such relative to thereby damp the relative movement. The trailer coupling further comprises two attachment plates. One pair of torque elements is fast with of the attachment plates and the other pair of torque elements is fast with the other attachment plate, the torque elements being interconnected by means of a set of linkages.

The torque element may include an outer tubular member of angular cross-section and an inner elongate member of angular cross-section within the tubular member, and a plurality of bodies of resilient material interposed between the inner and the outer members to mount the inner member with clearance within the outer member. The bodies of resilient material may be resiliently deformable to permit arcuate movement of the inner member within the outer member but to resist such movement.

The outer member may be a tube of metal such as steel having a square cross-section. The inner member may be a tube or a solid bar have a square cross-section. The bodies of resilient material may be pads of natural or synthetic rubber which may be positioned in the corners of the outer member to locate the inner member securely but yieldably within the outer member.

In one arrangement the attachment plates may be separate plates secured to the outer tubular members of the torque elements, for example by welding.

Alternatively, the attachment plates may be integral in one piece with one or more of the outer tubular members of the torque elements. In this arrangement two outer tubular members may be formed from one piece of sheet material with the two tubular members spaced apart from each other by a section of the sheet material forming the attachment plate.

If desired, the coupling may include two torque elements, one being fast with one of the attachment plates and the other being fast with the other attachment plate, and the elements being interconnected by means of linkages.

The torque element may in an alternative arrangement include a torque spring. In another arrangement it may include a torsion bar.

The torque element may be so arranged within the coupling that in the at rest position there is a predetermined spacing between the two attachment plates, and when the torque element is operated under a traction force, the distance between the attachment plates increases.

The invention is now described with reference to the accompanying drawings, in which:

FIG. 1 shows a three-dimensional view of one embodiment of a trailer coupling in accordance with the invention;

FIG. 2 shows a sectional view on line II—II of FIG. 1;

FIG. 3 shows a side view of the coupling shown in FIG. 1 mounted on a draughting vehicle;

Figure 4:
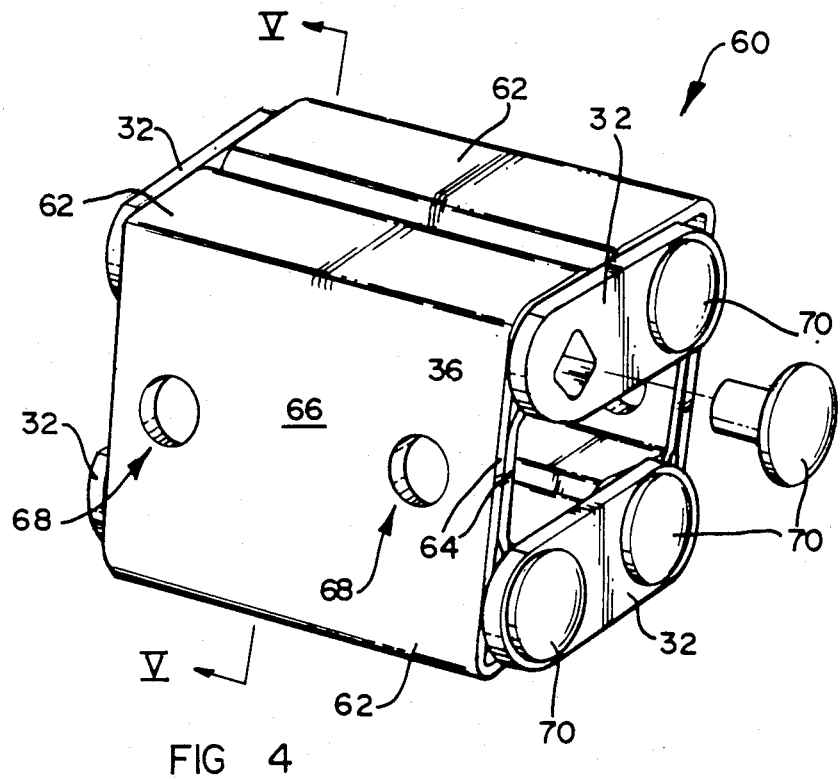
FIG. 4 shows a three-dimensional view of another embodiment of a trailer coupling in accordance with the invention.

Referring to FIGS. 1 to 3 of the drawings, reference numeral 10 indicates one embodiment of the trailer coupling in general. It includes two attachment plates 12 and 14 having holes 16 and 18 through which fastening bolts may be passed for mounting the coupling.

The coupling 10 further includes four torsion elements 20 and 22 fast with the attachment plate 12, and 24 and 26 fast with the attachment plate 14. The torsion elements 20 and 24 are interconnected by means of linkages 30, while the torsion elements 22 and 26 are interconnected by means of linkages 32.

Referring to FIG. 2, there is shown a cross-sectional view of the torsion element 24. The other torsion elements 20, 22 and 26 are identical. The torsion element 24 includes an outer steel tube 34 of square cross-section and a smaller bar 36 also of square cross-section which may be a tube as shown, or may be solid. The inner tube 36 is fitted within the outer tube 34 by means of four pads 38 of resilient material such as natural or synthetic rubber fitted in the corners of the outer tube 34 so that the inner tube 36 is held in position within the outer tube 34. When the inner tube 36 is turned within the outer tube 34, the resilient pads 38 are compressed, whereby torque is generated which resists arcuate movement which tends to urge the inner tube 36 to an at rest position within the outer tube 34 as shown in FIG. 2. The inner tube 36 is fast with the respective linkages 30 and 32 so that any movement of the inner tube 36 within the outer tube 34 is transmitted through the respective linkage 30, 32, and vice versa.

Referring to FIG. 3, the trailer coupling 10 is shown mounted on the rear end 40 of a draughting vehicle shown in dotted lines. The vehicle has a bumper 42 and a drawbar 44 to which the attachment plate 12 of the coupling 10 is secured by means of bolts 46. A trailer hook 48 shown in dotted lines is secured to the attachment plate 14 of the coupling 10 by means of securing bolts 50. A trailer (not shown) may be attached to the trailer hook 48.

In use, when the draughting vehicle 40 is in motion it transmits traction force via the coupling 10 to the trailer hook 48, whereby the trailer (not shown) is drawn. The traction force tends to increase the distance between the attachment plates 12 and 14, but this is resisted by the torque elements 20, 22, 24 and 26 in a manner described with reference to FIG. 2. When the traction force is constant the distance between the attachment plates 12 and 14 will remain fairly constant, but if the traction force should vary such as could happen when the draughting vehicle accelerates or decelerates, or if the trailer should decelerate, for example by hitting some obstacle, the variation in the traction force will be resisted by the torque elements 20, 22, 24 and 26 in the coupling 10, and this will tend to dampen the relative movement between the draughting vehicle and the trailer.

Figure 5:
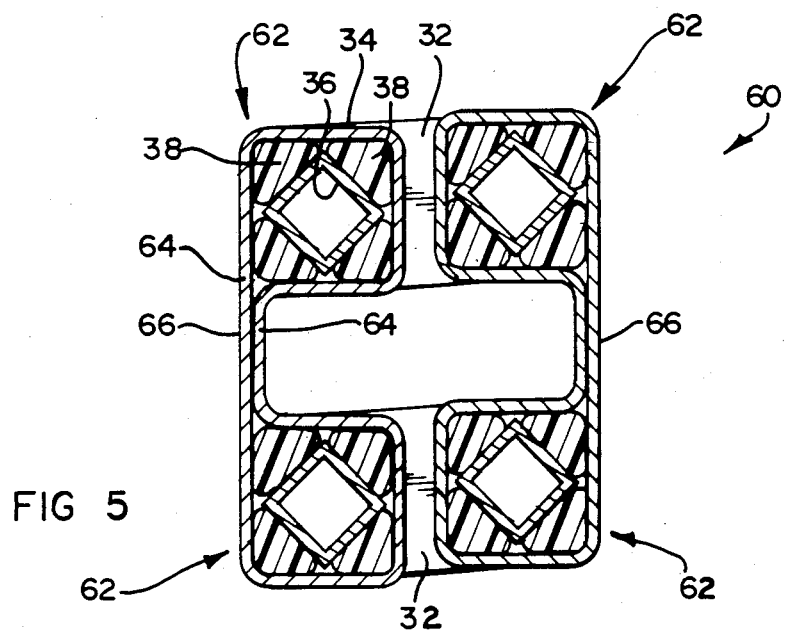
FIG. 5 shows a sectional view on line V—V of FIG. 4.

Referring to FIGS. 4 and 5 there is shown by reference numeral 60 another embodiment of a trailer coupling in accordance with the invention. Coupling 60 is similar to coupling 10 of FIGS. 1 to 3 but is of a lighter and more compact construction. It includes four torque elements 62 similar to the torque elements 24 of FIGS. 1 to 3 with like numbers indicating like items. The torque elements 62 are formed in pairs with each pair being formed in one piece from a single sheet of metal 64. Along the region 66 the sheet metal overlays itself and this forms an attachment plate similar to the plates 12,14 in FIGS. 1 and 3. Holes 68 similar to holes 16 in FIG. 1, extend through the attachment plates 66 for receiving fixing bolts (not shown) similar to the bolts 46,50 shown in FIG. 3. Plugs 70 are provided for covering the ends of the inner tubes 36 of the torque elements 62.

The coupling 60 is attached in the same manner as the coupling 10 described with reference to FIG. 3 and operates in the same manner.

We claim:

1. A trailer coupling comprising a plurality of torque elements having outer members, at least one torque element being resiliently yieldable under torque, arranged to permit relative movement between the drafting vehicle and the trailer in the direction of the traction force, and adapted to resist such relative movement to thereby damp the relative movement, and two spaced attachment plates, one for attaching the coupling to a drafting vehicle and the other for attaching it to a trailer, each attachment plate being integral in one piece from the same sheet material with the outer members of a pair of torque elements.

2. A trailer coupling comprisng at least one torque element which is resiliently yieldable under torque, which is arranged to permit relative movement between the drafting vehicle and the trailer in the direction of the traction force, and which is further adapted to resist such relative movement to thereby damp the relative movement, and two attachment plates, one for attaching the coupling to a drafting vehicle and the other for attaching it to a trailer, the attachments plates being spaced apart from each other with the torque element positioned between them, the torque element being fast with one of the plates and being operatively associated with the other attachment plate by means of a linkage.

3. A trailer coupling comprising four torque elements, at least one torque element being resiliently yieldable under torque, arranged to permit relative movement between the drafting vehicle and the trailer in the direction of the traction force, and adapted to resist such relative movement to thereby damp the relative movement, two attachment plates, one pair of torque elements being fast with one of the attachment plates, and the other pair being fast with the other attachment plate, and the torque elements being interconnected by means of a set of linkages.

* * * * *